United States Patent
Connell

(10) Patent No.: US 8,630,442 B2
(45) Date of Patent: Jan. 14, 2014

(54) METHOD AND APPARATUS FOR MAINTAINING A BACKGROUND IMAGE MODEL IN A BACKGROUND SUBTRACTION SYSTEM USING ACCUMULATED MOTION

(75) Inventor: Jonathan H. Connell, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1224 days.

(21) Appl. No.: 12/127,099

(22) Filed: May 27, 2008

(65) Prior Publication Data

US 2008/0226172 A1 Sep. 18, 2008

Related U.S. Application Data

(63) Continuation of application No. 11/345,854, filed on Feb. 2, 2006.

(51) Int. Cl.
*G06K 9/00* (2006.01)

(52) U.S. Cl.
USPC .......................................... 382/100; 382/173

(58) Field of Classification Search
USPC .................................................. 382/100, 173
See application file for complete search history.

(56) References Cited

U.S. PATENT DOCUMENTS 6,335,985 B1 * 1/2002 Sambonsugi et al. ......... 382/190
6,577,766 B1 * 6/2003 Standridge .................... 382/236

OTHER PUBLICATIONS

A Motion-Aided Video Shot Segmentation Algorithm. pp. 39-46. 2002. Authors Wei-Kuang Li and Shang-Hong Lai.*
Boult et al., "Into the Woods: Visual Surveillance of Non-Cooperative and Camouflaged Targets in Complex Outdoor Settings," Proceedings of the IEEE (Oct. 2001)
Javed et al., "A Hierarchical Approach to Robust Background Subtraction Using Color and Gradient Information," IEEE Workshop on Motion and Video Computing (Dec. 5-6, 2002).
Stauffer et al , "Adaptive Background Mixture Models for Real-Time Tracking," Proceedings IEEE Conf on Computer Vision and Pattern Recognition, pp. 246-252 (1999).

* cited by examiner

*Primary Examiner* — Hadi Akhavannik
(74) *Attorney, Agent, or Firm* — Ryan, Mason & Lewis, LLP

(57) ABSTRACT

Methods and apparatus are provided for maintaining a background image model in a background subtraction system using accumulated motion. A background image model is maintained by obtaining a map of accumulated motion; and adjusting the background image model based on the map of accumulated motion. The map of accumulated motion may be obtained, for example, based on one or more of motion field images; stability maps; frame differences; or information from a background subtraction system. Objects can be added to or removed from the background model or the background model can be otherwise updated One or more pixels from an image are added to the background image model if a stability measure for the one or more pixels satisfies a predefined criteria. A portion of the background image model can be invalidated in regions where the map of accumulated motion exceeds a predefined threshold.

27 Claims, 5 Drawing Sheets

METHOD AND APPARATUS FOR MAINTAINING A BACKGROUND IMAGE MODEL IN A BACKGROUND SUBTRACTION SYSTEM USING ACCUMULATED MOTION

CROSS-REFERENCE TO RELATED APPLICATIONS

This application is a continuation of U.S. patent application Ser. No. 11/345,854, filed Feb. 2, 2006, incorporated by reference herein

FIELD OF THE INVENTION

The present invention relates generally to imaging processing techniques, and, more particularly, to techniques for generating and maintaining background model images in a background subtraction system

BACKGROUND OF THE INVENTION

Background subtraction is a common technique for detecting moving objects in a largely stationary environment. Generally, background subtraction techniques compare a current image against a reference "empty" image and note regions of change. Such differences generally correspond to the moving foreground objects of interest for applications such as surveillance. However, a background model must first be created and then maintained.

A background model can be created, for example, by memorizing an "empty" image where there are no visible objects. However, this method is not generally applicable because it is difficult to ensure that a scene is clear of all moving objects, especially if it is being remotely monitored. Another technique monitors an incoming video stream for motion energy by subtracting adjacent frames When the overall energy is low enough, an input frame is captured and thereafter used as the background model. Unfortunately, if a moving object, such as a pedestrian, momentarily pauses, a background image might be acquired which erroneously includes this temporarily immobile object.

Conversely, moving objects may enter a scene and then stop moving (e.g., a parked car). Similarly, if a person enters a room and then becomes immobile, such as taking a nap, the person persists as a detected object. In many cases, such objects would be better interpreted as a part of the "new" background. Moreover, if a person is present when the reference "empty" image is acquired, the person will be detected once he or she starts to move across the scene. However, even after the person has completely exited the scene, a "hole" where the person was originally positioned will likely continue to be perceived as an object The background updates can be significant events in themselves. If an item is introduced into the scene (such as a briefcase carried surreptitiously by some agent), the item will also be marked as part of the foreground despite having no motion itself. A related situation is where some object that was part of the original reference image (e.g., a laptop computer) is removed from the scene. There will be a difference "hole" left behind in this case that is not only non-moving, but also not a solid object. There are several methods that can be used to locate non-moving regions in a background subtraction system, but it is difficult to classify such regions as abandoned objects, removed objects, state changes, or another phenomena.

The region type can be determined, for example, by comparing the pixel pattern in the region to the template of some known object (e.g., a computer monitor). If there is a non-moving foreground region and the associated pixels match the template, then a deposit event has occurred, otherwise a removal event is recorded. However, this approach requires that the system have a number of templates for each kind of object it cares about. Typically, such models must be manually entered, or an operator has to at least mark the boundaries of some region. A related approach requires that the system know something about the background near the non-moving region. If, for instance, the room had uniformly green walls, then the interior of the non-moving region could be examined to see if it was green or not (implying a removal or a deposit, respectively). Again, this is not a general purpose solution and works best if the characteristics of the environment can be chosen at will (like applying green paint).

Updating the background model is particularly important for environments in which lighting changes over time (e g, outdoors). Otherwise, lighting changes, such as the sun coming out from behind clouds, can cause large areas of the image to be falsely declared as foreground as they become better illuminated. Updating the background model is often done by slowly blending in newly acquired images with the old model. However, if the blending rate is fast and applied to the whole image, moving objects start to leave ghostly trails across the background model. Such anomalies can cause the system to both falsely detect nonexistent objects and miss detecting some valid objects. If, on the other hand, the blending rate is set very slow to reduce this effect, the system might not adapt quickly enough to the types of lighting changes that are present. Another updating option is to periodically reinitialize the background model from scratch using the current video frame This might be done, for instance, either on a regular schedule or when too large a portion of the image is marked as foreground While this approach prevents ghosting, it still suffers from the same initial model acquisition problems as described above Background blending, as discussed above, will eventually "erase" all stationary objects as well as "holes" left by removed objects. Unfortunately, this method tends to erase objects by shrinking them, leaving invalid partial objects as the regions are absorbed into the background. Moreover, background blending can also leave "ghost" objects behind if, say, a moving person lingers too long in one area. There exist more sophisticated systems that model the intensity at each pixel as one of several Gaussian distributions. These systems have better immunity to the "ghosting" problem, but the decision to switch from one Gaussian model to another is typically made independently for each pixel. This leads to objects or holes "sparkling" out, with incorrect ragged objects detected during the transition As apparent from the above-described deficiencies with conventional techniques for generating and updating a background model, a need exists for methods and apparatus for improved techniques for generating and updating a background model A further need exists for methods and apparatus for visual background subtraction that address each of the above-identified problems using one or more software pre-processing modules.

SUMMARY OF THE INVENTION

Generally, methods and apparatus are provided for maintaining a background image model in a background subtraction system using accumulated motion According to one aspect of the invention, a background image model is maintained by obtaining a map of accumulated motion; and adjusting the background image model based on the map of accumulated motion In one implementation, a counter is maintained indicating a degree of motion in a portion of a sequence of images.

The map of accumulated motion may be obtained, for example, based on one or more of motion field images; stability maps; frame differences; or information from a background subtraction system. Based on the map of accumulated motion, objects can be added to or removed from the background model or the background model can be otherwise updated According to another aspect of the invention, one or more pixels from an image are added to the background image model if a stability measure for the one or more pixels satisfies a predefined criteria. In addition, a portion of the background image model can be invalidated in regions where the map of accumulated motion exceeds a predefined threshold. A portion of an image can be copied, for example, to the background image model if a stability measure satisfies a predefined criteria.

A more complete understanding of the present invention, as well as further features and advantages of the present invention, will be obtained by reference to the following detailed description and drawings.

DETAILED DESCRIPTION OF PREFERRED EMBODIMENTS

The present invention provides methods and apparatus for maintaining a background image model in a background subtraction system using a map of accumulated motion. As discussed hereinafter, the map of accumulated motion can be obtained, for example, based on frame differences or from a background subtraction system. The accumulated motion can be employed to add or remove objects from the background model or to update the background model. The background model can be updated on a pixel-by-pixel basis or at a larger object level.

Figure 1:
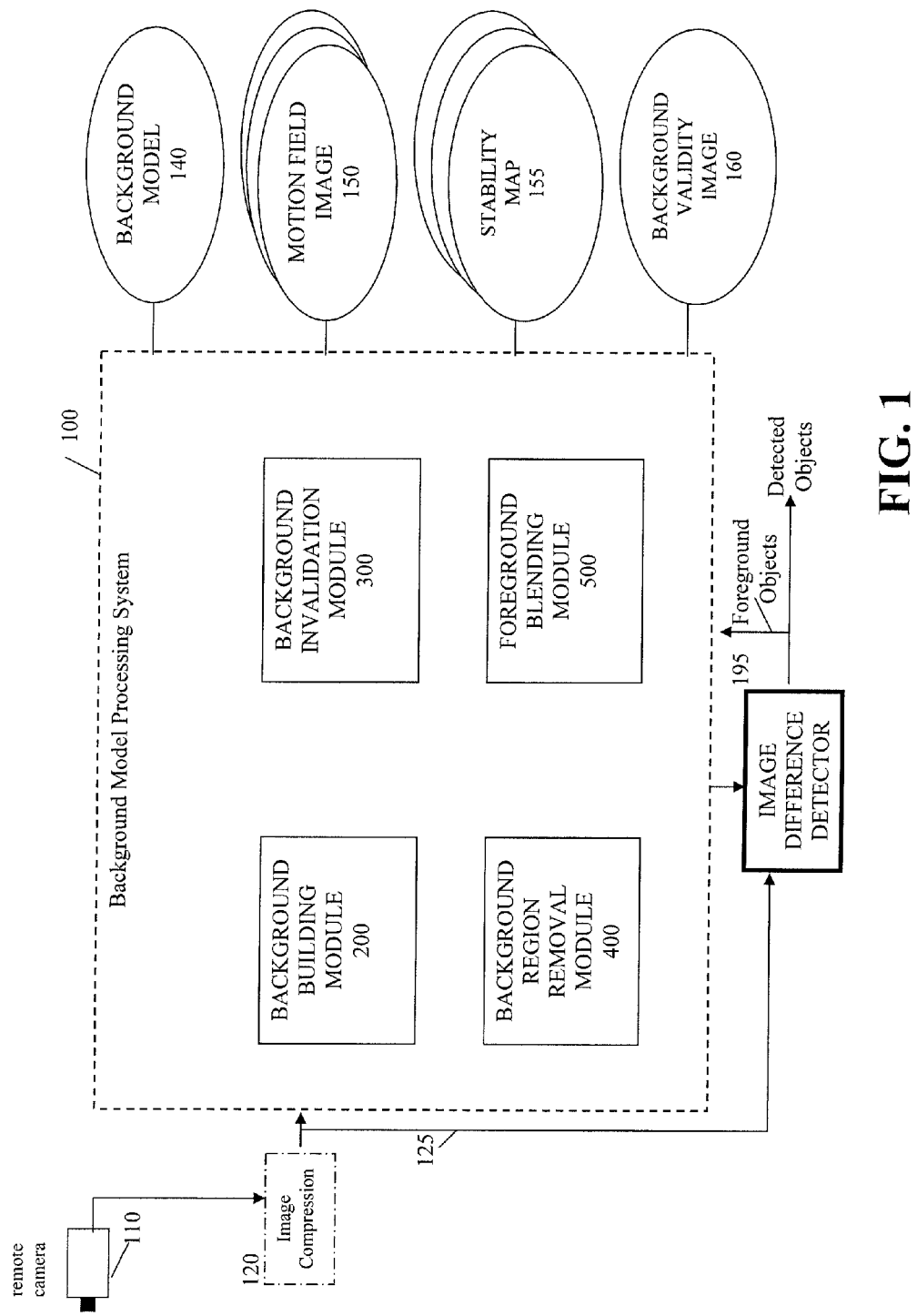
FIG. 1 is a schematic block diagram of a background model processing system incorporating features of the present invention.

FIG. 1 is a schematic block diagram of a background model processing system 100 incorporating features of the present invention. The background model processing system 100 maintains a background image model 140 using a map of accumulated motion. As discussed further below, the background model processing system 100 performs image difference detection at stage 195, for example, to detect one or more objects in an image, and employs one or more processing modules 200, 300, 400, 500, each discussed below in conjunction with FIGS. 2 through 5 respectively. The processed image may be obtained, for example, from a remote camera 110, and the images generally have undergone an image compression 120. The compressed image may be received, for example, over a transmission medium or channel 125, such as a wired or wireless link.

According to one aspect of the invention, one or more auxiliary images, referred to as motion field images 150, are maintained that indicate the source of frame-by-frame motion, such as where there has been recent motion in the image, differences and edges. As discussed hereinafter, the motion field images 150 are used to incrementally build, progressively update, and intelligently heal the background model. In addition, one or more stability maps 155 maintain historical information about the motion field images 150, such as non-motion frame counts for each pixel.

The motion field images 150 can be obtained, for example, by looking for difference over time between two images (such as binary, grayscale, or color). Based on the regions where a significant change is detected, the corresponding pixels are either incremented by a large value (but clipped to some maximum value, such as 255) or decremented by a certain amount (but prevented from assuming negative values). The particular methods below all use this core processing technique but differ in how they determine where pixels are incremented versus decremented, and in how the resulting map of motion (or non-motion) is interpreted.

The creation of the background model 140 starts by looking for regions that have been stable for a sufficient period of time. The corresponding pixels of the input image are then copied to create a partial background image As the offending object(s) moves away from various portions of the scene, corresponding parts of the background model 140 will be incrementally built. A separate background validity image 160 is maintained in accordance with another aspect of the invention to control where background subtraction can legitimately be performed (e.g., where the background has been built and remains valid versus still unknown)

According to one aspect of the invention, a similar motion map is used to control blending updates. The background model 140 is only changed in regions that have been stable for a sufficient duration. Also, regions that exhibit consistently high motion over long periods of time (e.g, bushes shaking in the wind) can be removed from the background validity image 160 and thereby reduce the number of false positive object detections.

The incremental motion-based technique allows rapid building of at least partial background models 140 (and hence the creation of at least partially valid background subtraction systems) despite the presence of moving objects. The use of a similar technique for background updating allows a fast blending rate to combat environmental lighting changes, but keeps foreground objects from being inadvertently mixed into the model.

A variation on the proposed technique treats detected objects as connected regions and decides whether to "push" each such region into the background model 140 based on a visual motion history. That is, it maintains a similar motion field map for the interior of detected foreground objects. Once a decision is made, the whole object can be removed within a single frame time, since regions are employed there are no confusing partial objects. Furthermore, the removal decision is based on examining the internal motion of an object. This helps prevent the introduction of "ghost" objects (and related "holes" when they are subsequently removed). For instance, suppose a person stops to talk to a colleague in the hall. Although the overall outline of the region describing the person remains constant for a long time, the internal fidgeting and gesticulation typically encountered will keep this object "alive" and prevent its merging with the background.

When a "healing" operation is performed, the category of the underlying real-world event can be determined by examining the edge information associated with an object. The classification system examines the periphery of non-moving regions in both the current image and the reference image to determine if a contour has been added or deleted. A deposited object will typically have a detectable intensity boundary around it A "hole," by contrast, will just expose the underlying texture in the environment. There will be no strong correlation between the region and the observable contour fragments. The proposed method not only tallies the amount of contour added or deleted, but also measures the fraction of the boundary area changed in order to make its decision.

The present invention allows stationary detected regions in the foreground to be differentiated into distinct types rather than requiring them all to be treated in the same manner. The present invention can accomplish this differentiation without iconic object models and with minimal constraints on the environment (e.g., some maximum degree of texture that can be tolerated in general)

Background Building Module

Figure 2:
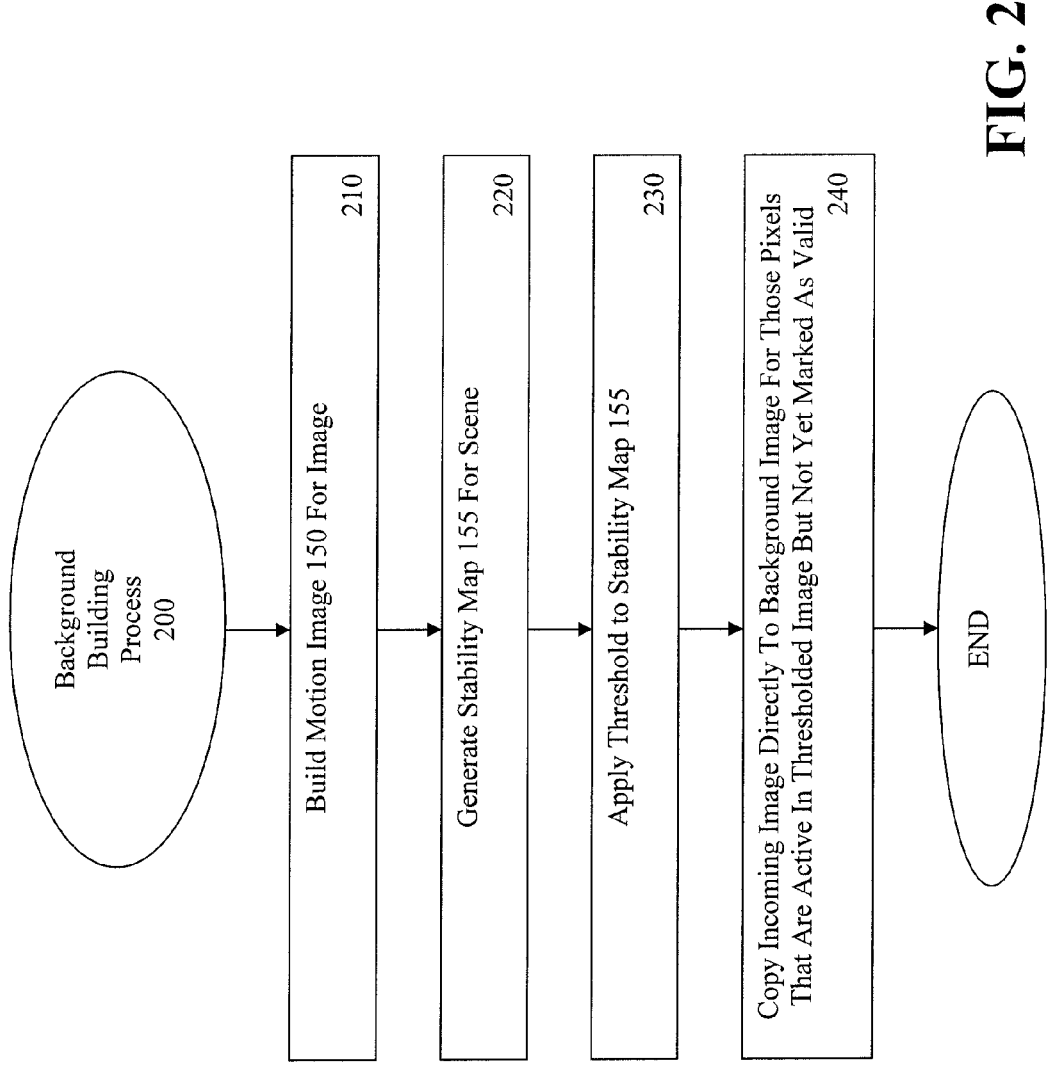
FIG. 2 is a flow chart describing an exemplary implementation of a background building method that may be employed by the background building module of FIG. 1.

According to one aspect of the invention, a background building module 200, discussed in conjunction with FIG. 2, generates a background image model 140 using a map of accumulated motion. In the exemplary implementation, the map of accumulated motion is obtained based on frame differences. The background building module 200 accumulates stillness in order to add objects to the background model 140 The background building module 200 updates the background model 140 on a pixel-by-pixel basis.

FIG. 2 is a flowchart describing an exemplary implementation of a process implemented by the background building module 200. As shown in FIG. 2, the background building module 200 initially builds a motion image 150 during step 210 for the image. In one embodiment, this is accomplished by converting the incoming video into a monochrome format and subtracting adjacent frames. This difference image is then smoothed slightly (for example, with a 3×3 mask) and, if increased noise immunity is desired, averaged with the smoothed difference image derived for the previous frame. A predefined threshold is then applied to the resulting preliminary motion image 150 at some detection value (e g., an intensity difference of 10 for pixels in the range 0 to 255) and a morphology-like operator is used to remove small noise areas.

Thereafter, a stability map 155 for the scene is generated during step 220. The stability map 155 keeps non-motion frame counts for each pixel and is initialized to all zeroes at the start of the video sequence. To form the stability map image 155, the initial binary motion image 150 is first combined with any detected foreground mask by logically ORing the two images together on a pixel-by-pixel basis This combined image can then be "fattened up" (typically by 9 pixels in a 160×120 image) using local average operators so that areas near detected motion or foreground objects also fall under the resulting motion image. In general, all the pixels of the stability image 155 are incremented on each successive frame However, where the motion image is active the counts are zeroed instead.

Finally, the stability map 155 is thresholded at some count during step 230 (e.g., 30 for video at 30 frames per second). The incoming image is copied directly to the background image 140 during step 240, but only for those pixels that are active in this thresholded image but not yet marked as valid When this copying occurs, the corresponding pixel in the background validity image 160 is set appropriately to indicate proper initialization (and prevent later overwriting).

Background Invalidation Module

Figure 3:
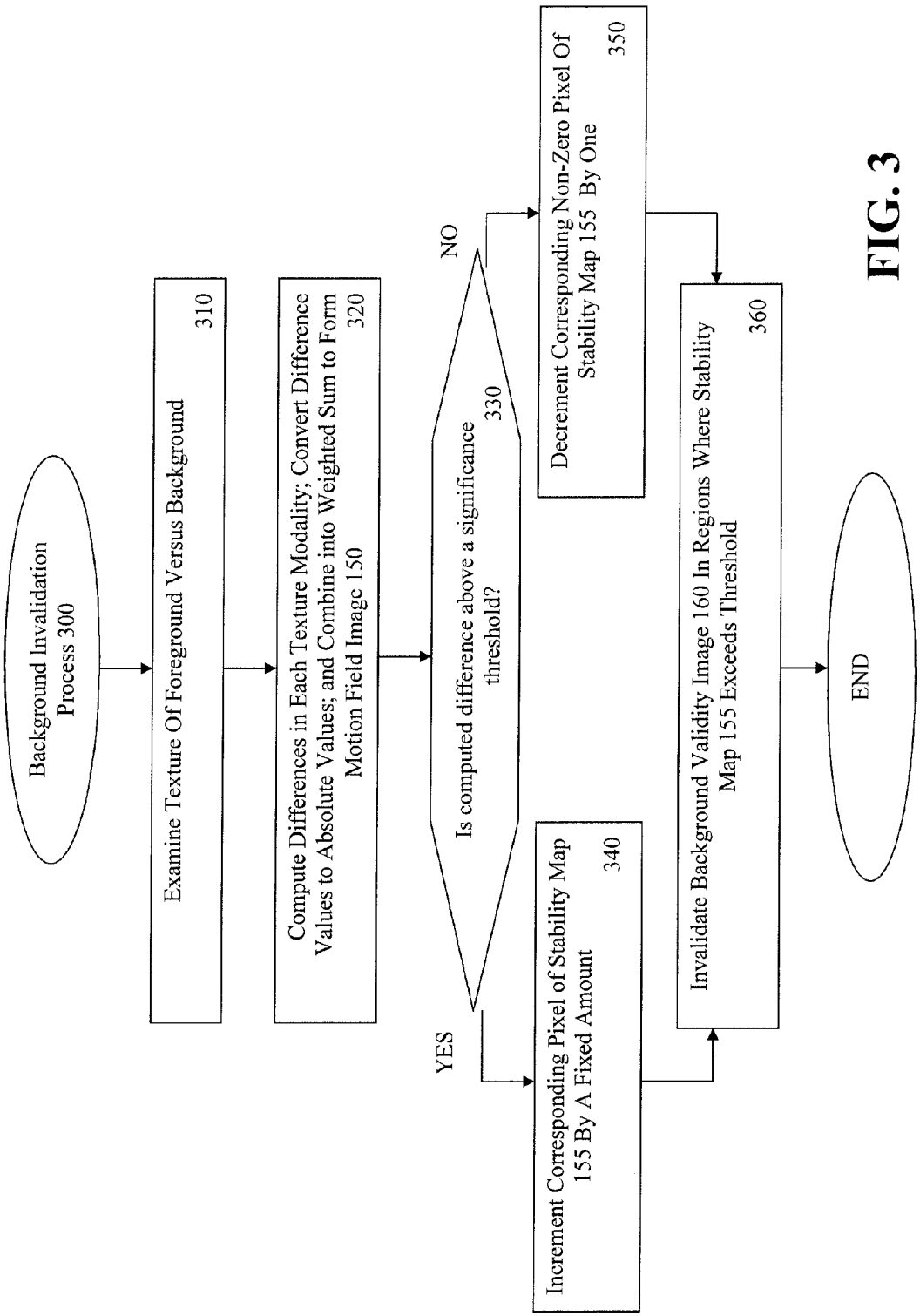
FIG. 3 is a flow chart describing an exemplary implementation of a background invalidation method that may be employed by the background invalidation module of FIG. 1.

According to another aspect of the invention, a background invalidation module 300, discussed in conjunction with FIG. 3, removes portions of the background image model 140 using the accumulated motion. In the exemplary implementation, the map of accumulated motion is obtained based on frame differences. The background invalidation module 300 accumulates motion activity in order to remove objects from the background model 140. The background invalidation module 300 updates the background model 140 on a pixel-by-pixel basis.

To detect persistent motion of background objects, such as wind ruffling the leaves of a tree, a motion image 150 is built by examining the texture of the foreground versus the background. In one exemplary embodiment, three 3×3 pixel edge operators are applied to the images during step 210: the Sobel horizontal mask, the Sobel vertical mask, and a center-surround (i e., top-hat) mask During step 320, differences are then computed in each texture modality (e g., horizontal in the current image versus horizontal in the background image), the difference values are then converted to absolute values, and then combined into a weighted sum to Form Motion Field Image 150. Edges are used to make the resulting difference map very sensitive to small scale motion.

A test is performed during step 330 to determine where the computed difference is above a significance threshold. When the computed difference is above the significance threshold, a corresponding pixel of stability map 155 is incremented by a fixed amount (e.g., 32) during step 340. In regions where there are currently no differences, the corresponding non-zero pixel of the stability map 155 is decremented by one during step 350. This image essentially keeps track of where there has been high (possibly intermittent) motion. The background validity image 160 is then invalidated during step 360 in regions where the stability map 155 exceeds a predefined threshold.

To provide an adequately long averaging interval it may be advantageous to only update the motion image every N frames (e.g., 4). Note that the motion image 150 from the background invalidation module 300 can be maintained for all regions of the image, even where the background is currently invalid. Thus, for example, if the wind stops blowing, the region corresponding to the bush could "settle down" and once again rejoin the rest of the valid background image 140.

Background Region Removal Module

Figure 4:
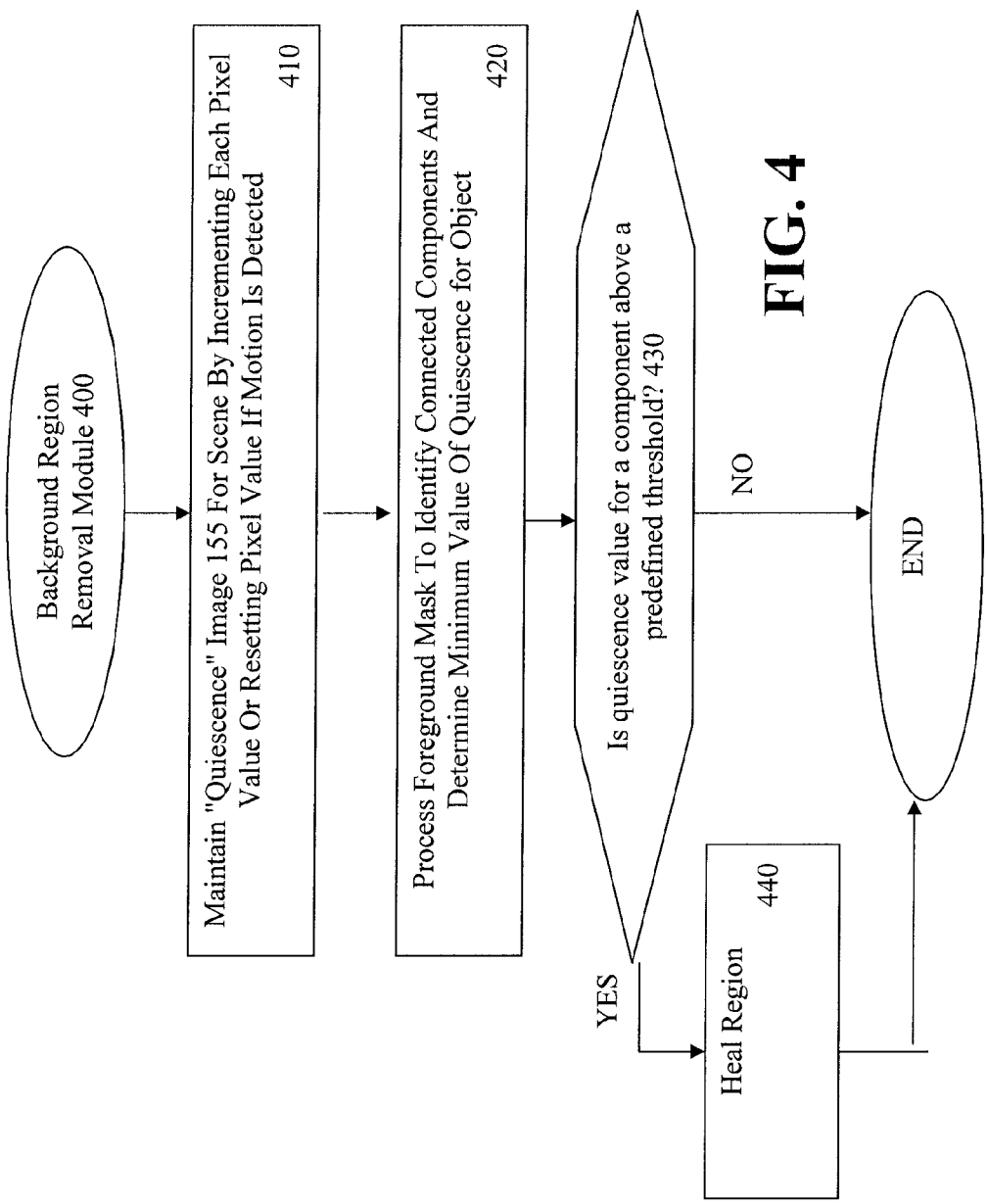
FIG. 4 is a flow chart describing an exemplary implementation of a background region removal process that may be employed by the background region removal module of FIG. 1.

According to another aspect of the invention, a background region removal module 400, discussed in conjunction with FIG. 4, alters portions of the background image model 140 using the accumulated motion In the exemplary implementation, the map of accumulated motion is obtained based on frame differences. The background region removal module 400 accumulates stillness in order to alter objects in the background model 140 The background region removal module 400 updates the background model 140 on an object level.

As shown in FIG. 4, the background region removal module 400 maintains the stability map 155 (i.e., a "quiescence" image) for the scene during step 410. Generally, each pixel in this image 155 is incremented by one on each successive frame (or other regular interval), up to some maximum saturation value (typically 255). However, if motion is detected at a pixel, its quiescence value is reset to zero instead in the stability map 155 The motion value for each pixel is derived from a motion map image 150.

In one embodiment, this motion image 150 is implemented as the pixel-wise difference of two successive monochrome video frames. Morphological operations (implemented using local average operators) are then optionally performed on this raw motion image to eliminate potential noise-like responses and generate a binary version. Finally, the initial binary version is "fattened up" (typically by 9 pixels) using additional morphology-like operations to yield the final binary motion image 150. This image 150 encodes the decision of whether there has been recent motion at or around each pixel.

The background region removal module 400 then interprets the quiescence image 155 with respect to a binary foreground mask received from the image difference detector 195. The foreground mask is first broken into connected components during step 420, then all the pixel locations in each component are checked against the quiescence image 150. The minimum value of quiescence encountered is recorded for each component. Thus, even if only one small part of an object is moving, the whole object will inherit that motion value.

If it is determined during step 430 that the quiescence value for a component is above a predefined threshold (such as 150), it is proposed as a region to be "healed" during step 440 Healing is accomplished, for example, by copying directly to the background model that portion of the current image corresponding to the pixels of the selected component. Generally, the quiescence image 155 remains untouched. If the quiescence value for a component is not above a predefined threshold during step 430, program control terminates.

However, when a region is identified as a candidate for healing, instead of being automatically assimilated, the region can instead be proposed to some higher level of processing This higher level might have access to additional information about the object region, such as whether it was a deposited object, removed object, or an interesting object being actively tracked. Depending on the circumstances, this higher level might veto the healing of the region for the time being. In this case, the background model 140 remains unchanged but the quiescence values for all the associated pixels are initialized to zero. This prevents the system from proposing to heal the exact same region on the very next frame.

Region Classification

The above described background region removal module 400 can be supplemented by a region classification system that can classify an object that is removed from (or added to) the background model 140.

The region classification system works by first generating a mask for the boundary around a specified stationary foreground region. In one implementation, the region classification system creates a spatially expanded version of the binary object using local average operators, and another spatially shrunken version also derived from local average operations. The two versions are then differenced to find the pixels that are in the fat version but not in the skinny version. The resulting mask marks the pixels that are near the boundary of the specified object. In one embodiment, this ring mask is about 5-7 pixels wide.

Next, a determination is made for each portion of the boundary ring image about whether there are any edges there. In one embodiment, intensity edges are first computed for both the current image and the reference background image. This can be accomplished, for example, by convolving 3×3 pixel Sobel masks with monochrome versions of each image. The resulting magnitude responses are then thresholded above some minimum value (like 30) and combined with the spatial ring mask using a logical AND operator. Finally, the gated edges are again smeared by a morphology-like operator so they are approximately as thick as the ring in the boundary mask image, then ANDed back with the original ring mask. Fattening the edge responses in this way compensates for the slight shifting of edge responses under different lighting conditions, and helps prevent counting complex parallel edges more heavily than simple edges.

Finally, the two gated edge images are subtracted to form a ternary (3-valued) image showing where contour has been added, removed, or remained the same (i.e, either both images had edges there, or both images were smooth). Note that this spatial subtraction directly links edge events to specific locations (as opposed to comparing just the total number of edge pixels in the respective gated ring images, where a thicker edge in one area might compensate for the lack of any edge in another place).

The number of added pixels and subtracted pixels are then totaled separately and compared to the overall area of the ring mask. If the overall ring area is below a threshold value (e.g., 100 pixels), an indeterminate state is flagged. Otherwise, when the amount of added contour is above some minimum fraction of the total ring area (typically 7%) and is also greater than some factor (typically 1.5×) times the amount of contour removed, an object deposition event is reported. Conversely, when the count of subtracted contour satisfies similar conditions, an object removal event is declared. If, instead, the amounts of contour added or subtracted are both small or comparable, a state-change event is reported.

Foreground Blending Module

Figure 5:
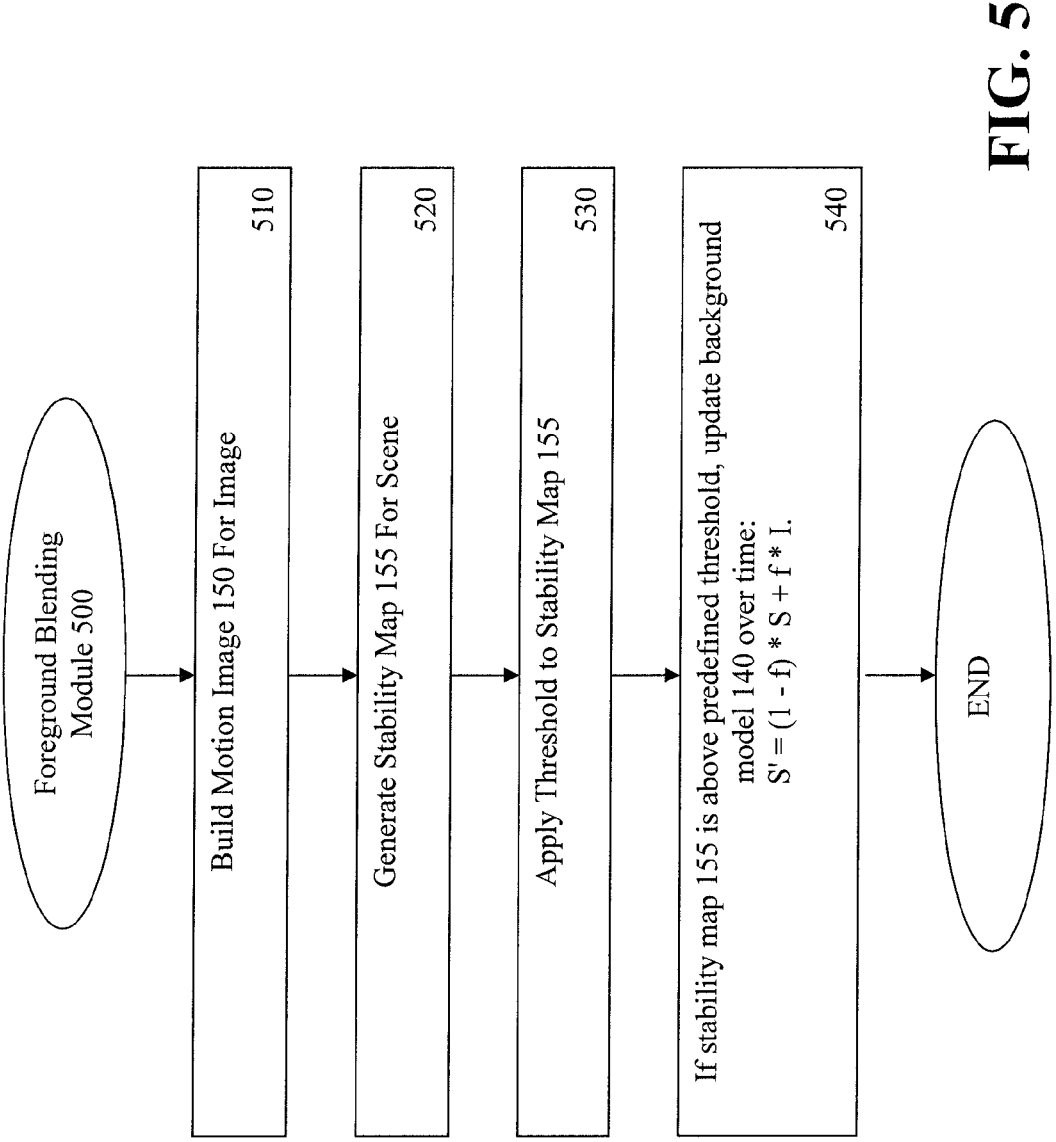
FIG. 5 is a flow chart describing an exemplary implementation of a foreground blending module that may be employed by the foreground blending module of FIG. 1.

According to another aspect of the invention, a foreground blending module 500, discussed in conjunction with FIG. 5, alters or updates portions of the background image model 140 using the accumulated motion In the exemplary implementation, the map of accumulated motion is obtained based on foreground objects. The foreground blending module 500 accumulates stillness in order to alter or update objects in the background model 140. The foreground blending module 500 updates the background model 140 on a pixel-by-pixel level It is noted that the foreground blending module 500 employs the same motion field images 150 and stability maps 155 as the background building module 200.

FIG. 5 is a flowchart describing an exemplary implementation of a process implemented by the foreground blending module 500. As shown in FIG. 5, the foreground blending module 500 initially builds a motion image 150 during step 510 for the image In one embodiment, this is accomplished by converting the incoming video into a monochrome format and subtracting adjacent frames. This difference image can then be smoothed slightly (for example, with a 3×3 mask) and, if increased noise immunity is desired, averaged with the smoothed difference image derived for the previous frame. A predefined threshold is then applied to the resulting preliminary motion image 150 at some detection value (e g, an intensity difference of 10 for pixels in the range 0 to 255) and a morphology-like operator is used to remove small noise areas.

Thereafter, a stability map 155 for the scene is generated during step 520 The stability map 155 keeps non-motion frame counts for each pixel and is initialized to all zeroes at the start of the video sequence. To form the stability map image 155, the initial binary motion image 150 can first be combined with any detected foreground mask by logically ORing the two images together on a pixel-by-pixel basis. This combined image can then be "fattened up" (typically by 9 pixels in a 160×120 image) using local average operators so that areas near detected motion or foreground objects also full under the resulting motion image In general, all the pixels of the stability image 155 are incremented on each successive frame. However, where the motion image is active the counts are zeroed instead.

Finally, the stability map 155 is thresholded at some count during step 530 (e.g., 30 for video at 30 frames per second). To update the background model 140 (S) over time, the current image (I) is fractionally blended into the background model 140 For example, $$S'=(1-f)*S+f*I.$$

for a blending coefficient, f. However, this blending only takes place where the stability map 155 is above the predefined threshold (such as 30 for video at 30 frames per second, as above). Yet, for very low values of the blending coefficient, f, this can potentially cause significant loss of detail if both the input and background image are restricted to 8 bit pixels. Therefore, this blending can be performed at a rate that is less than every frame, but rather at every $n^{th}$ (e.g., 3rd) frame. This allows a more reasonable blending factor (e.g., 10%) to be used to simulate the effects of a smaller one (e g., 3%).

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

What is claimed is:

1. A method for maintaining a background image model, comprising:
   obtaining a map of accumulated motion; and
   adjusting said background image model using at least one hardware device based on said map of accumulated motion.

2. The method of claim 1, wherein said step of obtaining a map of accumulated motion further comprises the step of obtaining one or more motion field images.

3. The method of claim 1, wherein said step of obtaining a map of accumulated motion further comprises the step of obtaining one or more stability maps.

4. The method of claim 1, wherein said step of obtaining a map of accumulated motion further comprises the step of maintaining a counter indicating a degree of motion in a portion of a sequence of images.

5. The method of claim 1, wherein said map of accumulated motion is obtained based on frame differences.

6. The method of claim 1, wherein said map of accumulated motion is obtained based on information from a background subtraction system.

7. The method of claim 1, wherein said adjusting step further comprises the step of adding an object to said background model.

8. The method of claim 1, wherein said adjusting step further comprises the step of removing an object from said background model.

9. The method of claim 1, wherein said adjusting step further comprises the updating said background model.

10. The method of claim 1, wherein said adjusting step further comprises the updating said background model on a pixel-by-pixel basis.

11. The method of claim 1, wherein said adjusting step further comprises the updating said background model on an object level.

12. The method of claim 1, further comprising the step of adding one or more pixels from an image to said background image model if a stability measure for said one or more pixels satisfies a predefined criteria.

13. The method of claim 1, wherein said adjusting step further comprises the step of invalidating a portion of said background image model in regions where said map of accumulated motion exceeds a predefined threshold.

14. The method of claim 1, wherein said adjusting step further comprises the step of copying a portion of an image to said background image model if a stability measure satisfies a predefined criteria.

15. The method of claim 1, wherein said adjusting step further comprises the step of updating said background image model over time if a stability measure satisfies a predefined criteria.

16. The method of claim 1, further comprising the step of determining whether an object has been added to or deleted from an image by examining edge information associated with an object.

17. The method of claim 16, wherein an added object has a detectable intensity boundary and a removed object exposes an underlying homogeneous region in an environment.

18. A system for maintaining a background image model, comprising:
   a memory; and
   at least one processor, coupled to the memory, operative to:
   obtain a map of accumulated motion; and
   adjust said background image model based on said map of accumulated motion.

19. The system of claim 18, wherein said processor is further configured to obtain one or more of motion field images and stability maps.

20. The system of claim 18, wherein said processor is further configured to maintain a counter indicating a degree of motion in a portion of a sequence of images.

21. The system of claim 18, wherein said map of accumulated motion is obtained based on one or more of frame differences; or information from a background subtraction system.

22. The system of claim 18, wherein said processor is further configured to add an object to said background model, remove an object from said background model or update said background model.

23. The system of claim 18, wherein said processor is further configured to add one or more pixels from an image to said background image model if a stability measure for said one or more pixels satisfies a predefined criteria.

24. The system of claim 18, wherein said processor is further configured to invalidate a portion of said background image model in regions where said map of accumulated motion exceeds a predefined threshold.

25. The system of claim 18, wherein said processor is further configured to copy a portion of an image to said background image model if a stability measure satisfies a predefined criteria.

26. The system of claim 18, wherein said processor is further configured to update said background image model over time if a stability measure satisfies a predefined criteria.

27. An article of manufacture for maintaining a background image model, comprising a non-transitory computer readable storage medium containing one or more programs which when executed implement the steps of:
   obtaining a map of accumulated motion; and
   adjusting said background image model based on said map of accumulated motion.

\* \* \* \* \*